(No Model.)

B. S. MARTIN.
FISH HOOK.

No. 523,988. Patented Aug. 7, 1894.

Inventor
Burrell S. Martin.

Witnesses
Chas. A. Ford.
W. S. Duvall.

By his Attorneys.
C. A. Snow & Co.

UNITED STATES PATENT OFFICE.

BURRELL S. MARTIN, OF ANGOLA, NEW YORK.

FISH-HOOK.

SPECIFICATION forming part of Letters Patent No. 523,988, dated August 7, 1894.

Application filed December 9, 1893. Serial No. 493,217. (No model.)

*To all whom it may concern:*

Be it known that I, BURRELL S. MARTIN, a citizen of the United States, residing at Angola, in the county of Erie and State of New York, have invented a new and useful Fish-Hook, of which the following is a specification.

My invention relates to improvements in fish-hooks, the objects in view being to produce a hook, the same being so constructed as to adapt it to catch the fish with as light a catch as possible and even should they nibble at the bait, and when the hook is not sufficiently swallowed or taken to cause the regular barb to engage with the fish.

All fish-hooks now in use are provided with barbs or beards at the inner sides of their hook portions, and in order to effect a catch and land the same with safety, it is necessary that sufficient of the hook should be swallowed or taken into the mouth to cause said barb to engage with the flesh or gill. It is also commonly known that fish often nibble at the bait and yet do not take into their mouths a sufficient quantity of the hook to insure a catch.

My invention therefore has the above stated objects in view, and to overcome the last stated difficulty whereby a light nibble will insure a catch the same as if the entire hook were swallowed.

A further object of the invention is to prevent the fish from shaking the hook out of the wound produced by a slight puncture.

The invention consists therefore in a fish-hook, the inclined side of the body adjacent to the point and above the barb is provided with one or a plurality of sharp beards inclined in the same direction as the barb and smaller in size than the latter.

Figure 1:
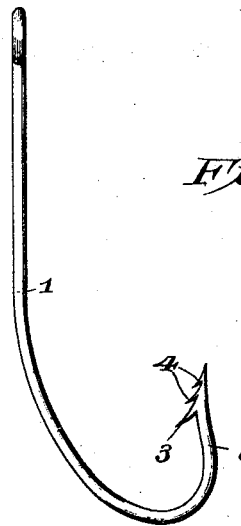
Figure 2:
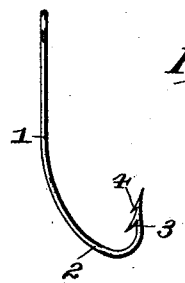

Referring to the drawings:—Figure 1 is an elevation of a fish-hook embodying my invention. Fig. 2 is a similar view of a modified construction.

Like numerals of reference indicate like parts in both figures of the drawings.

The shank 1, hook 2, and barb 3 are similar to those now in use, the said barb being located upon the inner side of the hook portion below the point, and having the usual inner edge inclined toward the point. Between the barb and point of the hook I provide the inner side of the hook with one, or a plurality, of sharp smaller beards 4 disposed similarly to the barb, and, as shown in Fig. 1, I may employ a plurality of them, or as shown in Fig. 2, I may employ a single beard. Regardless of the fact of whether or not one or a plurality of beards are employed, the result is the same, and it requires but a slight portion, or in fact, merely the point of the hook to be taken into the mouth to effect the catch. It is necessary that a fish should nibble at a bait until a portion of the hook at least should be taken in, and immediately that the fish attempts to move away from the hook, the beards engage with the mouth and the struggles of the fish to free himself cause more of the hook to enter the mouth and finally the large barb commonly employed is taken in, and the catch is complete.

Having described my invention, what I claim is—

The herein described improved fish hook, the same having one or more beards located on the tapered inner side of the hook portion intermediately between its point and the regular barb, and disposed outwardly and away from the point, and inclined in the same direction as the said barb, but smaller in size than the latter, substantially as specified.

In testimony that I claim the foregoing as my own I have hereto affixed my signature in the presence of two witnesses.

BURRELL S. MARTIN.

Witnesses:
JULIUS M. SCHWEST,
FRANK E. CANDEE.